US012089025B2

(12) United States Patent
Toita

(10) Patent No.: US 12,089,025 B2
(45) Date of Patent: *Sep. 10, 2024

(54) SPEAKER

(71) Applicant: Alps Alpine Co., LTD, Tokyo (JP)

(72) Inventor: Hiroki Toita, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 181 days.

This patent is subject to a terminal disclaimer.

(21) Appl. No.: 17/886,827

(22) Filed: Aug. 12, 2022

(65) Prior Publication Data

US 2023/0057212 A1 Feb. 23, 2023

(30) Foreign Application Priority Data

Aug. 23, 2021 (JP) ................................ 2021-135710

(51) Int. Cl.
*H04R 9/06* (2006.01)
*H04R 9/02* (2006.01)

(52) U.S. Cl.
CPC ............... *H04R 9/06* (2013.01); *H04R 9/025* (2013.01); *H04R 2400/11* (2013.01)

(58) Field of Classification Search
CPC ....... H04R 9/06; H04R 9/025; H04R 2400/11
See application file for complete search history.

(56) References Cited

U.S. PATENT DOCUMENTS

| | | | | |
|---|---|---|---|---|
| 11,805,367 | B2 * | 10/2023 | Toita | H04R 1/2803 |
| 2022/0312123 | A1 * | 9/2022 | Toita | H04R 9/025 |

FOREIGN PATENT DOCUMENTS

| | | | |
|---|---|---|---|
| JP | 57-184397 A | 11/1982 | |
| JP | 0 107 777 A1 | 5/1984 | |
| JP | 1 049 353 A2 | 11/2000 | |

OTHER PUBLICATIONS

Extended European Search Report from corresponding European patent application No. 22188671.6-1207, Feb. 2, 2023, 5 pgs.

* cited by examiner

*Primary Examiner* — Suhan Ni
(74) *Attorney, Agent, or Firm* — Crowell & Moring LLP

(57) ABSTRACT

A detection unit has a fixed magnet, which is part of a magnetic circuit unit, and also has a movable magnet and a magnetic sensor, which are disposed below a cap. A fixed magnetic field component oriented toward a vibration direction acts on the magnetic sensor due to a leakage flux from the magnetic circuit unit. A movable magnetic field component acts from the movable magnet on the magnetic sensor in a direction crossing the fixed magnetic field component. A change in the angle of a detection magnetic field component, which is a combined vector formed from the magnetic field components in two directions, is detected by the magnetic sensor. According to the output in this detection, the operational position of the movable magnet is measured.

17 Claims, 4 Drawing Sheets

SPEAKER

RELATED APPLICATION

The present application claims priority to Japanese Patent Application Number 2021-135710, filed Aug. 23, 2021, the entirety of which is hereby incorporated by reference.

BACKGROUND

1. Field of the Invention

The present invention relates to a speaker that can highly precisely measure the operation of a vibration unit including a diaphragm by using a magnetic sensor.

2. Description of the Related Art

A conventional speaker in an acoustic device has only performed processing to accept an audio signal output from an amplifier without alteration and reproduce sound pressure. The speaker itself has not performed a control operation matching the audio signal. This has made produced sounds likely to be distorted and also has made variations likely to occur in sound quality. Another problem has been that when the amplitude of the diaphragm becomes too large, the diaphragm or damper may be damaged.

To solve the above problems, a speaker system described in JP 57-184397 A performs feedback control by using a magnetic sensor to detect the motion of the diaphragm.

This speaker system has a plate that is part of a magnetic circuit unit. A hall element, which is a magnetic sensor, is supported at a portion on this plate facing a voice coil. An effective magnetic flux density in a gap in the magnetic circuit unit is detected by the hall element. The resulting detection signal is amplified and fed back to a power amplifier. When a driving current is given from the power amplifier to the voice coil and a bobbin vibrates together with the voice coil, the effective magnetic flux density in the gap is changed by a current flowing in the voice coil and a counter-electromotive force generated in the voice coil. When this change in effective magnetic flux density is detected by the hall element and is then fed back to the power amplifier, distortion in the driving current to be given to the voice coil is corrected.

In feedback control in the speaker system described in JP 57-184397 A, a hall element, which is smaller than a coil or an optical detection element, is used as a detection element. This can prevent the size of the speaker from becoming too large and can also prevent an increase in power consumption. However, in the method in which a hall element is used to detect a change in effective magnetic flux density in the gap in the magnetic circuit unit, the motion of the voice coil or bobbin cannot be directly detected. Therefore, it is difficult to highly precisely correct distorted sound, variations in sound quality, and the like.

In addition, since the speaker system in JP 57-184397 A is structured so that the hall element is embedded in a portion in the plate facing the voice coil, the structure to attach the hall element is complex and assembling work is inefficient.

SUMMARY

The present disclosure addresses the conventional problems described above with the object of providing a speaker that can highly precisely detect vibration in a vibration unit by using a magnetic sensor that detects magnetic field components in two directions.

A speaker according to the present disclosure has a vibration unit that has a diaphragm, a bobbin fixed to the diaphragm, and a voice coil disposed on the bobbin, a support unit that supports the vibration unit so that it can vibrate, and a magnetic circuit unit included in the support unit.

The magnetic circuit unit has a magnetic gap in which the voice coil is positioned, an inner yoke positioned more inside than is the magnetic gap, and a fixed magnet that forms a driving magnetic flux that traverses the magnetic gap and flows in the inner yoke along a vibration direction in which the vibration unit vibrates.

A movable magnet is fixed to the vibration unit, the movable magnet forming a movable magnetic flux oriented so as to cross the vibration direction.

A magnetic sensor is fixed to the support member, the magnetic sensor being positioned more inside than is the magnetic gap when viewed in a plane perpendicular to the vibration direction.

A fixed magnetic field component and a movable magnetic field component are detected by the magnetic sensor, the fixed magnetic field component acting in the vibration direction according to a leakage flux from the magnetic circuit unit, the movable magnetic field component acting in a direction crossing the fixed magnetic field component according to the movable magnetic flux. The operation of the vibration unit is measured according to a change in the strength of the movable magnetic field component.

In the speaker in the present disclosure, the orientation of a combined vector formed from the magnetic field components in two directions is detected by the magnetic sensor. Alternatively, the ratio in strength between the magnetic field components in the two directions is detected by the magnetic sensor.

In the speaker in the present disclosure, a center hole along the vibration direction is preferably formed in the inner yoke. The magnetic sensor is preferably positioned in the area of the center hole when viewed in a plane perpendicular to the vibration direction.

In the speaker in the present disclosure, a sensor support member is fixed to the inner yoke, the magnetic sensor is supported by the sensor support member, and a wiring material having continuity with the magnetic sensor passes through the interior of the center hole and extends to the outside.

The speaker in the present disclosure can be structured so that the center hole is covered with the sensor support member.

In the speaker in the present disclosure, a cap that covers the bobbin from the same side as the diaphragm is preferably provided in the vibration unit, and the movable magnet is preferably fixed to the cap.

With the speaker in the present disclosure, magnetic field components in two directions that cross each other are detected by a magnetic sensor fixed to a support unit, the two magnetic field components being a fixed magnetic field component, which is a leakage flux from a magnetic circuit unit, and a movable magnetic field component from a movable magnet, which moves together with a vibration unit. For example, since a change in the orientation of a combined vector having the two magnetic field components is obtained or a relative value between the two magnetic field components is obtained, the operation of the vibration unit can be precisely measured without being affected by surrounding noise. According to the results of the measurement, highly precise feedback control by which the operation of the vibration unit is corrected can be performed, The fixed magnetic field component is a magnetic field component that has leaked from an inner yoke in the magnetic circuit unit and is oriented in a vibration direction. The magnetic sensor is placed more inside than is a magnetic gap in plan view, preferably positioned in a center hole in the inner yoke in plan view. Thus, it is possible to detect the fixed magnetic field component that has leaked from the magnetic circuit unit so as to be oriented in the vibration direction and has stable strength. Accordingly, it is also possible to obtain a stable detection output from the magnetic sensor.

DETAILED DESCRIPTION OF THE PREFERRED EMBODIMENTS

Figure 1A:
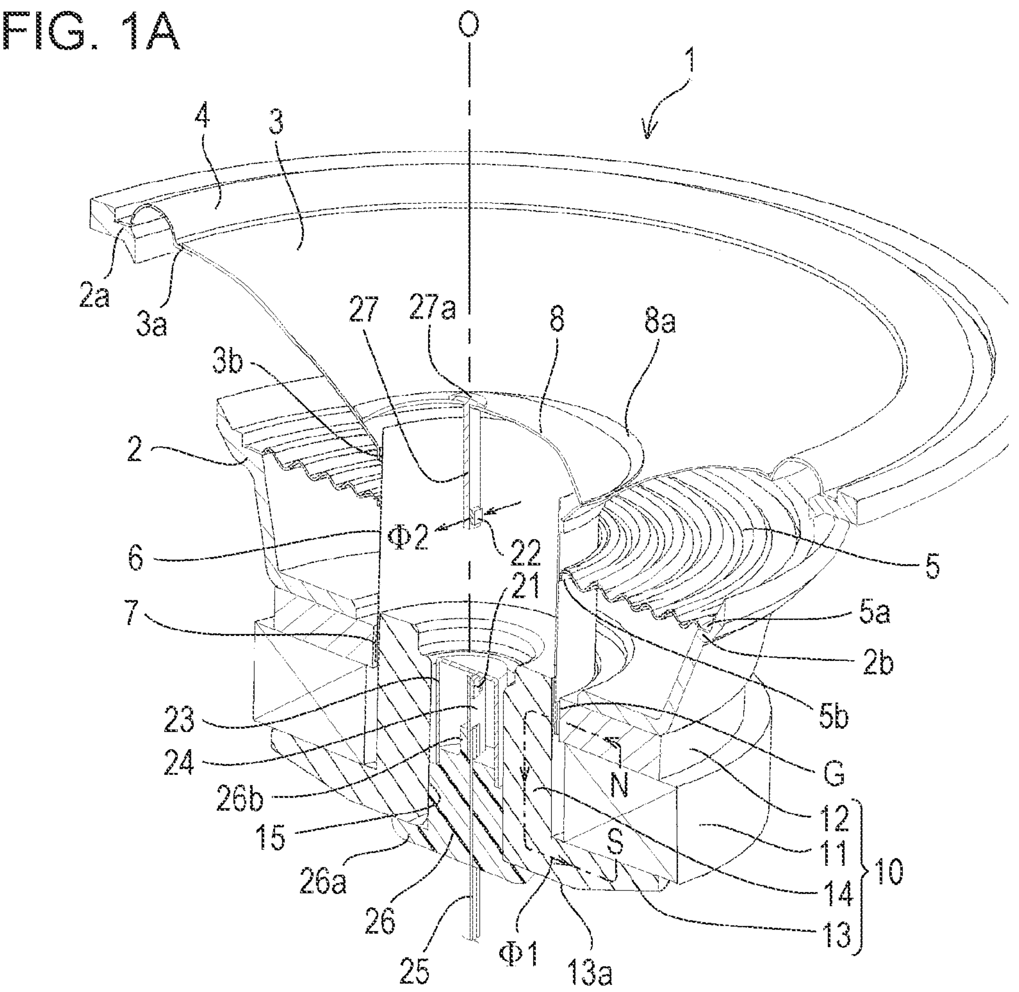
FIG. 1A is a perspective view illustrating a half cross section of a speaker in a first embodiment of the present invention when the speaker is cut by a plane that is parallel to an X-Z plane and includes the central axis O.

In FIG. 1A illustrating a speaker 1 in a first embodiment of the present invention, the Z1-Z2 direction is the front-back direction, the Z1 direction being toward the front, the Z2 direction being toward the back. A vibration unit vibrates in the Z1-Z2 direction. With the speaker 1, the Z1 direction may be used as a direction in which sound is generated due to vibration of the vibration unit or the Z2 direction may be used as that sound generation direction.

In FIG. 1A, the central axis O extends in the front-back direction (Z1-Z2 direction). The main part of the speaker 1 is structured so as to be substantially rotationally symmetric with respect to the central axis O. The central axis O passes through the center of a diaphragm 3, the center of a bobbin 6, and the center of a magnetic circuit unit 10. In FIG. 1A, the X1-X2 axis and Y1-Y2 axis are orthogonal to each other in a plane orthogonal to the central axis O.

The speaker 1 illustrated in FIG. 1A has a frame 2. The frame 2 is formed from a non-magnetic material or a magnetic material. The frame 2 is tapered so that the diameter is gradually increased toward the front (in the Z1 direction). The magnetic circuit unit 10 is fixed to the back (in the Z2 direction) of the frame 2 with an adhesive, screws, or another means. The frame 2 and magnetic circuit unit 10 constitute a support unit.

The magnetic circuit unit 10 has a fixed magnet 11 in a ring shape, the center of which is the central axis O, an opposing yoke 12, in a ring shape, joined to the front of the fixed magnet 11, and a backward yoke 13, in a ring shape, joined to the back of the fixed magnet 11. An inner yoke 14 is formed as part of the backward yoke 13. The inner yoke 14, which is positioned more inside than are the fixed magnet 11 and opposing yoke 12, is formed so as to protrude from the backward yoke 13 toward the front (in the Z1 direction). The inner yoke 14 may be formed separately from the backward yoke 13, and the backward yoke 13 and inner yoke 14 may be joined together. The opposing yoke 12, backward yoke 13, and inner yoke 14 are formed from a magnetic material, that is, a magnetic metal material.

A magnetic gap G is formed between the outer circumferential surface of the inner yoke 14 and the inner circumferential surface of the opposing yoke 12 so as to be along a circumference, the center of which is the central axis O. The inner yoke 14 is positioned more inside than is the magnetic gap G. In the embodiment illustrated in FIG. 1A, the surface, facing forward (in the Z1 direction), of the fixed magnet 11 positioned more outside than is the magnetic gap G is magnetized to the N pole, and the surface, facing backward (in the Z2 direction), of the fixed magnet 11 is magnetized to the S pole. Therefore, a driving magnetic flux Φ1 generated from the fixed magnet 11 circulates. Specifically, the driving magnetic flux Φ1 flows in the opposing yoke 12 toward the central axis O and traverses the magnetic gap G. After having traversed the magnetic gap G, the driving magnetic flux Φ1 flows in the inner yoke 14 in a direction along the central axis O, that is, the Z2 direction, along the direction in which the vibration unit vibrates. The driving magnetic flux Φ1 then passes through the backward yoke 13, and returns to the fixed magnet 11. The magnetic circuit unit 10 may be magnetized so that the surface, facing backward (in the Z2 direction), of the fixed magnet 11 becomes the N pole, and the surface, facing forward (in the Z1 direction), of the fixed magnet 11 becomes the S pole.

The diaphragm 3 is disposed inside the front of the frame 2. The diaphragm 3 is conical, that is, in a so-called cone shape. The front edge circumference 2*a* of the frame 2 and the outer circumferential edge 3*a* of the diaphragm 3 are joined together through an edge member 4, which can be elastically deformed. The edge member 4 and front edge circumference 2*a* are fixed together with an adhesive, and the edge member 4 and outer circumferential edge 3*a* are fixed together with an adhesive. An inner circumference fixing part 2*b* is formed on the inner surface of the frame 2 at an intermediate point. The outer circumferential part 5*a* of a damper member 5, the cross section of which is in a corrugated shape and which can be elastically deformed, is fixed to the inner circumference fixing part 2*b* with an adhesive.

The bobbin 6 is provided inside the frame 2. The bobbin 6 has a cylindrical shape, the center of which is the central axis O. The inner circumferential edge 3*b* of the diaphragm 3 is fixed to the outer circumferential surface of the bobbin 6 with an adhesive. The inner circumferential part 5*b* of the damper member 5 is also fixed to the outer circumferential surface of the bobbin 6 with an adhesive. A cap 8 in a dome shape protruding toward the front is provided at the central part of the diaphragm 3. The cap 8 covers an opening at the front of the bobbin 6 so as to block the opening. The circumference 8*a* of the cap 8 is fixed to the front surface of the diaphragm 3 with an adhesive.

A voice coil 7 is provided on the outer circumferential surface of the bobbin 6 at the backward end, the backward end facing backward (in the Z2 direction). A coated conductor, which constitutes the voice coil 7, is wound on the outer circumferential surface of the bobbin 6 by a predetermined number of turns. The voice coil 7 is positioned in the magnetic gap G in the magnetic circuit unit 10. The magnetic circuit unit 10 and voice coil 7 constitute a magnetic driving unit.

The diaphragm 3 and bobbin 6 are supported through the elastic deformation of the edge member 4 and damper member 5, which are each an elastic support member, so that the diaphragm 3 and bobbin 6 can vibrate in the front-back direction (Z1-Z2 direction) with respect to the frame 2 (with respect to the support unit). A pair of the diaphragm 3 and the cap 8 and a pair of the bobbin 6 and the voice coil 7 constitute the vibration unit that vibrates in the front-back direction with respect to the support unit, which includes the frame 2. Portions of the edge member 4 and damper member 5 that vibrate in the front-back direction together with the diaphragm 3 are also part of the vibration unit.

A detection unit (vibration detection unit) that detects the vibration of the vibration unit is provided in the speaker 1. The detection unit is composed of the magnetic circuit unit 10, a movable magnet 22, which vibrates toward a movable unit together with the diaphragm 3, and a magnetic sensor 21 fixed to the support unit side.

In the magnetic circuit unit 10, a center hole 15 is formed in the inner yoke 14 so as to pass through the inner yoke 14 in the front-back direction, as illustrated in FIG. 1A. The cross section of the center hole 15 is a circle, the center of which is the central axis O. A sensor support member 26 is fitted to the center hole 15. The sensor support member 26 is formed from a synthetic resin material, a synthetic rubber, or another non-magnetic material. A protection cap 23 is fixed to the front end of the sensor support member 26. The protection cap 23 is formed from a non-magnetic metal material, a synthetic resin material, or another non-magnetic material. A sealed support space is formed between the sensor support member 26 and the protection cap 23. In the support space, a circuit board 24 is fixed to a support protrusion 26*b*, which is formed as part of the sensor support member 26. The magnetic sensor 21 is mounted on the circuit board 24. A wiring material 25 is connected to the circuit board 24. A continuity is formed between the wiring material 25 and the terminals 21*a* (see FIG. 1B) of the magnetic sensor 21 through a conductive pattern formed on the front surface of the circuit board 24. The wiring material 25 passes through the interior of the sensor support member 26 and also passes through the center hole 15, after which the wiring material 25 extends to a space at the back of the speaker 1.

The sensor support member 26, protection cap 23, circuit board 24, magnetic sensor 21, and wiring material 25 can be unitized by being assembled in advance. With the protection cap 23 facing forward, the sensor support member 26, protection cap 23, circuit board 24, magnetic sensor 21, and wiring material 25 in the unitized state are inserted into the interior of the center hole 15 from the back until a flange 26*a* formed at the back end of the sensor support member 26 abuts the back surface 13*a* of the backward yoke 13. Then, the magnetic sensor 21 and wiring material 25 can be positioned and installed in the interior of the magnetic circuit unit 10, which is part of the support unit. The sensor support member 26 is fixed to the magnetic circuit unit 10 by being press-fitted to the interior of the center hole 15. Alternatively, the sensor support member 26 is fixed to the magnetic circuit unit 10 with an adhesive, screws, or another fixing means. Even when the magnetic sensor 21, circuit board 24, or the like fails, the sensor support member 26 and magnetic sensor 21, which are unitized, can be pulled out backward from the center hole 15. Therefore, maintenance work can be easily performed.

A magnet support member 27 is fixed to the center of the cap 8 as illustrated in FIG. 1A. A fixing portion 27*a* is formed at the front end of the magnet support member 27.

To fix the magnet support member 27, the fixing portion 27*a* is bonded to the cap 8. The magnet support member 27 extends backward (in the Z2 direction) from the cap 8 toward the space in the bobbin 6. The movable magnet 22 is bonded and fixed to the back of the magnet support member 27. The movable magnet 22 is positioned substantially on the central axis O.

The movable magnet 22 is magnetized so that the surface facing the Y1 side becomes the N pole and the surface facing the Y2 side becomes the S pole. Therefore, a movable magnetic flux Φ2 generated from the movable magnet 22 is oriented in the Y1 direction. In the magnetic circuit unit 10, the orientation of the driving magnetic flux Φ1 flowing in the inner yoke 14 is directed in the front-back direction (Z1-Z2 direction), in which the vibration unit vibrates, that is, in the direction along the central axis O. The direction in which the movable magnet 22 is magnetized and the orientation of the driving magnetic flux Φ1 flowing in the inner yoke 14 cross each other, preferably are orthogonal to each other. The orientation of the movable magnetic flux Φ2 exiting from the movable magnet 22 and the orientation of the driving magnetic flux Φ1 also cross each other, preferably are orthogonal to each other.

In the embodiment illustrated in FIG. 1, the center of the magnetic sensor 21 and the center of the movable magnet 22 are both on the central axis O. The movable magnet 22 is placed at a distance from the protection cap 23 toward the front so that when the vibration unit operates in the front-back direction with the maximum amplitude, the movable magnet 22 does not come into contact with the protection cap 23.

Figure 1B:
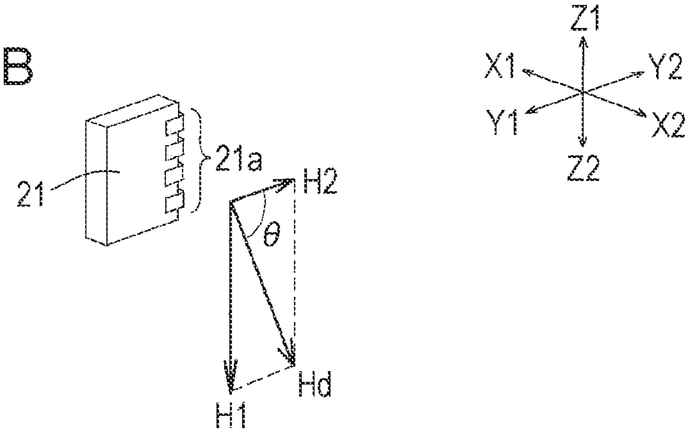
FIG. 1B is a partial perspective view illustrating two magnetic field components acting on a magnetic sensor.

The magnetic sensor 21 is positioned more inside than is the magnetic gap G and also more inside than are the bobbin 6 and voice coil 7 when viewed in a plane perpendicular to the direction in which the vibration unit vibrates, that is, a plane perpendicular to the central axis O. A fixed magnetic field component H1 based on a leakage flux from the magnetic circuit unit 10 and a movable magnetic field component H2 based on the movable magnetic flux Φ2 generated in the movable magnet 22 act on the magnetic sensor 21 as illustrated in FIG. 1B. Since in the inner yoke 14, the driving magnetic flux Φ1 flows in the Z2 direction along the central axis O, the fixed magnetic field component H1 acts on the magnetic sensor 21 in the Z2 direction due to the leakage flux of the driving magnetic flux 431. Since the movable magnet 22 is magnetized in the Y direction and the movable magnetic flux Φ2 exiting from the N pole of the movable magnet 22 in the Y1 direction circulates in the space and then returns to the S pole of the movable magnet 22, the movable magnetic field component H2 based on the movable magnetic flux Φ2 acts on the magnetic sensor 21 in the Y2 direction. The strength of the fixed magnetic field component H1 is the amount of vector oriented in the Z2 direction. The strength of the movable magnetic field component H2 is the amount of vector oriented in the Y2 direction. The strength of the fixed magnetic field component H1 acting on the magnetic sensor 21 is substantially constant. By contrast, the strength of the movable magnetic field component H2 varies with the vibration of the vibration unit.

In a Y-Z plane including the central axis O, the magnetic sensor 21 can detect two magnetic field components, H1 and H2, each of which is the amount of vector. The magnetic sensor 21 has at least one magnetoresistance effect element. The magnetoresistance effect element is a giant magnetoresistive (GMR) element or a tunnel magnetoresistive (TMR) element having a fixed magnetic layer and a free magnetic layer. The magnetization orientation of the fixed magnetic layer is in a predetermined direction in a Y-Z plane. The predetermined direction is unchanged; for example, it is the Y2 direction. The free magnetic layer is changed to a single-magnetic-domain layer due to a bias magnetic field. The magnetization orientation of the free magnetic layer follows the orientation of a magnetic field applied from the outside and changes in a Y-Z plane. The electric resistance of the magnetoresistance effect element varies with a change in the relative angle between the magnetization orientation of the fixed magnetic layer and the magnetization orientation of the free magnetic layer is magnetized.

The fixed magnetic field component H1, which is the amount of vector oriented in the Z2 direction, and the movable magnetic field component H2, which is the amount of vector oriented in the Y2 direction, act on the magnetic sensor 21, as illustrated in FIG. 1B. Therefore, the magnetization orientation of the free magnetic layer of the magnetoresistance effect element follows the orientation of a detection magnetic field component Hd, which is the vector sum of the fixed magnetic field component H1 and movable magnetic field component H2. When the movable magnet 22 fixed to the vibration unit moves forward (in the Z1 direction) and thereby become distant from the magnetic sensor 21, the strength of the movable magnetic field component H2 acting on the magnetic sensor 21 is lowered. This widens the angle θ of the vector of the detection magnetic field component Hd with respect to the Y2 direction, which is the magnetization direction of the fixed magnetic field, and thereby increases the electric resistance of the magnetoresistance effect element. When the movable magnet 22 moves backward (in the Z2 direction) and thereby comes close to the magnetic sensor 21, the strength of the movable magnetic field component H2 is increased. This reduces the angle θ of the vector of the detection magnetic field component Hd and thereby lowers the electric resistance of the magnetoresistance effect element.

In the magnetic sensor 21, two detection elements having directivity, such as hall elements, may be disposed so that their detection directions cross each other, preferably are orthogonal to each other in a Y-Z plane. In the magnetic sensor 21 of this type, the strength of the fixed magnetic field component H1 is detected by one detection element having directivity in the Z-axis direction, and the strength of the movable magnetic field component H2 is detected by the other detection element having directivity in the Y-axis direction. When the ratio between the strength of the fixed magnetic field component H1, which is substantially constant, and the strength of the movable magnetic field component H2, which varies with the vibration of the vibration unit, is determined through a detection circuit (not illustrated), it is possible to obtain a detection output equivalent as when a change in the angle θ of the vector of the detection magnetic field component Hd is determined.

Next, the sound generation operation of the speaker 1 will be described.

In the sound generation operation, a driving current is given to the voice coil 7 according to an audio signal output from an audio amplifier. Since the driving magnetic flux Φ1 generated from the magnetic circuit unit 10 traverses the voice coil 7, the vibration unit including the diaphragm 3, bobbin 6, and voice coil 7 vibrates in the front-back direction due to an electromagnetic force excited by the driving magnetic flux Φ1 and driving current. Then, sound pressure is generated according to the frequency of the driving current, generating a sound forward (in the Z1 direction) or backward (in the Z2 direction).

A circuit unit (not illustrated) connected to the speaker 1 has a detection circuit and a control unit. A detection output from the magnetic sensor 21 is detected by the detection circuit and is then given to the control unit. In the control unit, feedback control is performed according to the detection output from the magnetic sensor 21. When a change in the angle θ of the vector of the detection magnetic field component Hd is detected by the magnetic sensor 21, the control unit can measure the position of the vibration unit including the diaphragm 3 in the front-back direction as well as a change in the position. For example, the control unit calculates the amount of deviation between an ideal position of the vibration unit in the front-back direction, the ideal position being assumed according to the applied audio signal, and the actual position of the vibration unit, the actual position being measured from the detection output from the magnetic sensor 21, as well as the amount of deviation between a change in the ideal position and a change in the actual change. When the amount of deviation exceeds a threshold value, a compensation signal (offset signal) that compensates for the amount of deviation is superimposed on a driving signal (driving current), after which the resulting signal is given to the voice coil 7. In this feedback control, the distortion of a sound generated by the speaker 1, a synchronization failure in sound, or the like is corrected. In addition, the excessive vibration of the diaphragm 3 is prevented in the front-back direction.

The magnetic sensor 21 measures a change in the strength of the movable magnetic field component H2 with respect to the strength of the fixed magnetic field component H1, which is substantially constant, so a change in the inclination of the detection magnetic field component Hd, which is a combined vector, is detected or the ratio between the strength of the fixed magnetic field component H1 and the strength of the movable magnetic field component H2 is detected. Since the strength of the fixed magnetic field component H1, which is substantially constant, is used as the reference, the position and operation of the vibration unit can be precisely measured without being easily affected by external noise. In addition, since a leakage flux from the magnetic circuit unit 10, which may give noise to detection operation, is used in detection operation and the leakage flux is detected as the fixed magnetic field component H1 used as a reference, high-sensitivity feedback control can be always performed with high precision without being easily affected by external noise.

When the structure of the detection unit is viewed in a plane perpendicular to the vibration direction, that is, a plane (X-Y plane) perpendicular to the central axis O or when the structure of the detection unit is viewed by projecting the structure to an X-Y plane, the magnetic sensor 21 is positioned more inside, that is, closer to the central axis O, than is the magnetic gap G. As is clear also from embodiments illustrated in FIG. 2 and later, the length dimension of the inner yoke 14 in the Z1-Z2 direction is greater than its thickness dimension in the X1-X2 direction (thickness dimension in a radial direction), so in the inner yoke 14, the path length of the driving magnetic flux Φ1 is short in the X1 direction (direction toward the central axis O) and is long in the Z2 direction. Therefore, at a position more inside than the magnetic gap G, the density of the leakage flux from the magnetic circuit unit 10 is relatively larger and more stable in the Z2 direction than in the X1 direction. Since the strength of the fixed magnetic field component H1 used as the reference value is stable, a stable detection output can be obtained without being easily affected by noise.

In particular, when the magnetic sensor 21 is positioned within the range of the center hole 15 in the inner yoke 14 when the structure of the detection unit is viewed in an X-Y plane or by projecting the structure of the detection unit to an X-Y plane, the magnetic flux density of the leakage flux can be increased in the Z1 direction in an area in which the magnetic sensor 21 is disposed, so the strength to be detected by the magnetic sensor 21 of the fixed magnetic field component H1 can be stabilized. In addition, in the embodiment illustrated in FIG. 1A, the magnetic sensor 21 is positioned in the center hole 15 in the front-back direction as well and is positioned on the central axis O positioned at the center of the center hole 15. Near the central axis O in the center hole 15, the magnetic flux density of the leakage flux is high in the Z1 direction, so the strength detected by the magnetic sensor 21 of the fixed magnetic field component H1 is stabilized. Since the strength of the fixed magnetic field component H1 can be stably detected, the relative ratio in strength between the fixed magnetic field component H1 and the movable magnetic field component H2 can be detected at low noise.

Figure 2:
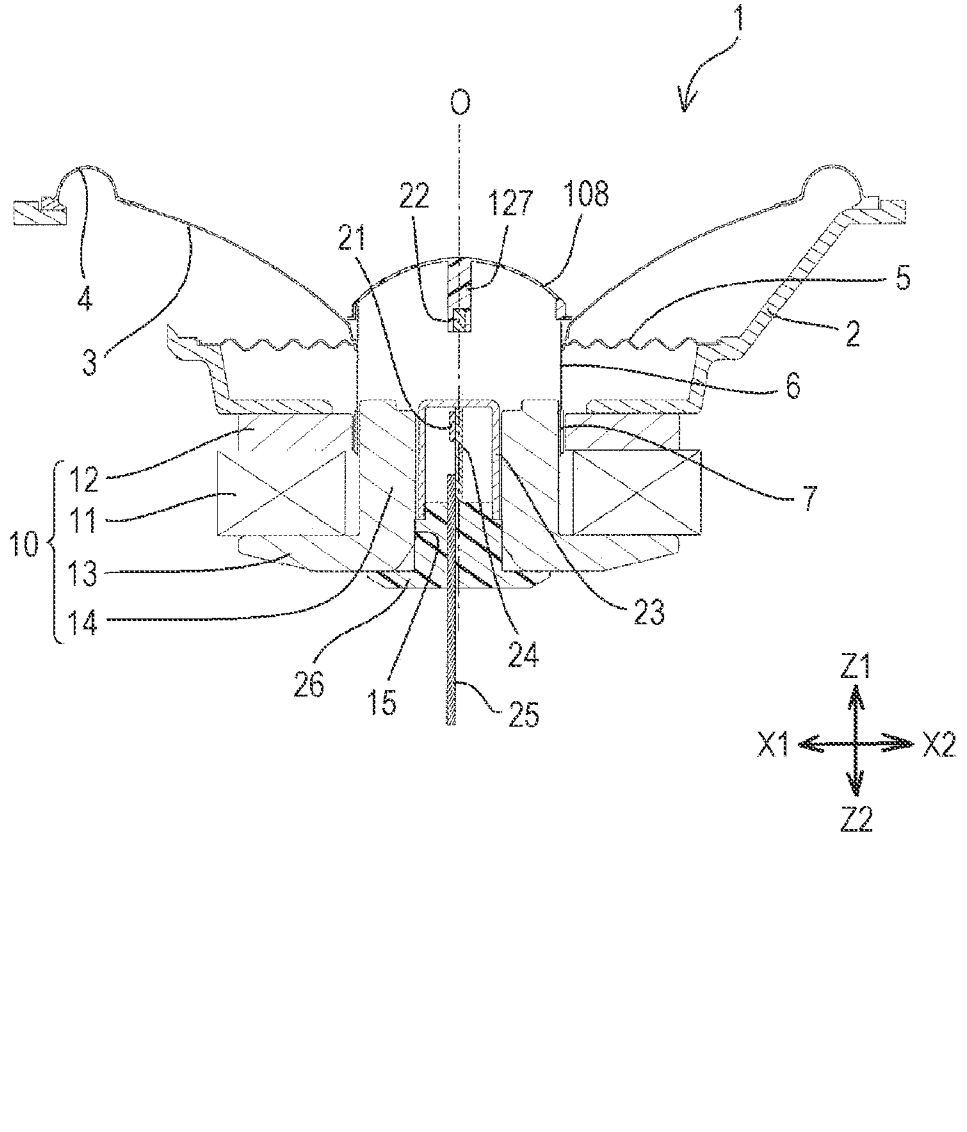
FIG. 2 is a sectional view illustrating a variation of the speaker in the first embodiment when the speaker is cut by a plane that is parallel to an X-Z plane and includes the central axis O.

FIG. 2 illustrates a variation of the speaker 1 in the first embodiment of the present invention. The speaker 1 of this type has a cap 108 different from the cap 8 illustrated in FIG. 1A. The cap 108, which is formed from a synthetic resin material or the like, is fitted to an end of the bobbin 6, the end being oriented forward (in the Z1 direction), and is fixed with an adhesive or the like. The cap 108 integrally has a magnet support member 127. The movable magnet 22 is fixed to the magnet support member 127.

With the speaker 1 illustrated in FIG. 2, the cap 108 and movable magnet 22 can be easily fixed to the front end of the bobbin 6 at the final stage of assembly work. Therefore, after the magnetic circuit unit 10 is fixed to the frame 2 and the diaphragm 3, edge member 4, bobbin 6, and voice coil 7 are then attached but before the cap 108 is attached, work to magnetize the fixed magnet 11 in the magnetic circuit unit 10 can be performed, after which the cap 108 and movable magnet 22 can be easily attached. In this assembly work, the magnetized state of the movable magnet 22 is not affected by the magnetizing field used to magnetize the fixed magnet 11.

Figure 3:
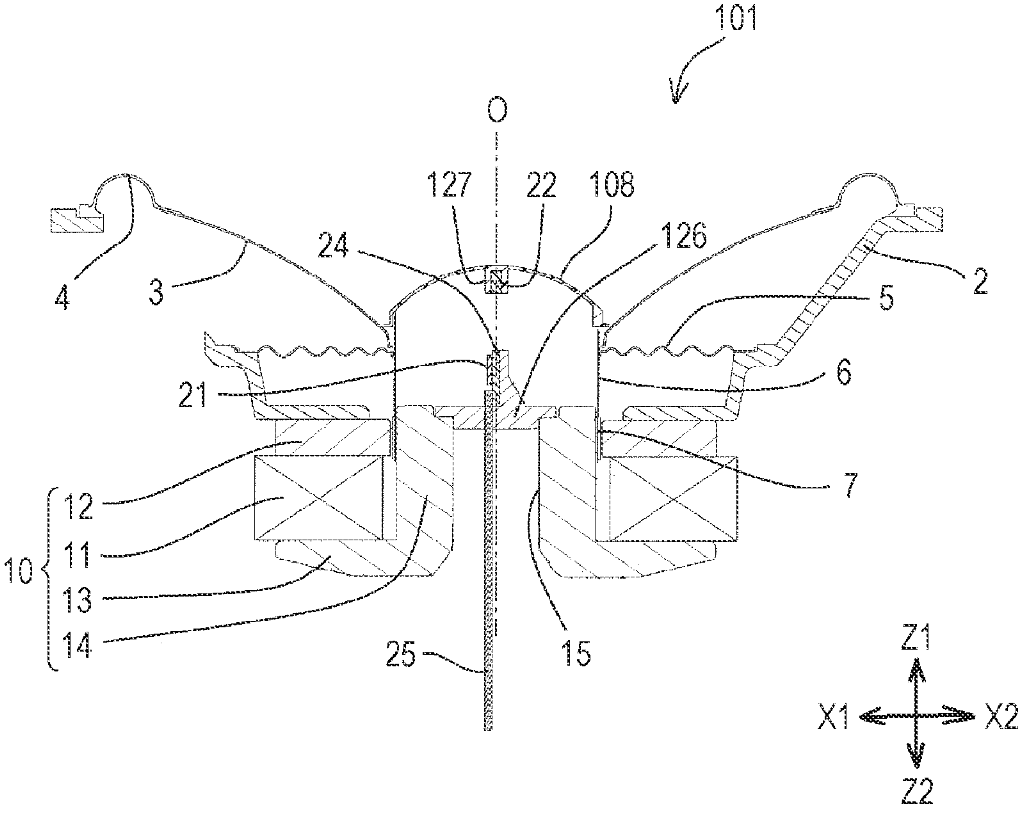
FIG. 3 is a sectional view illustrating a speaker in a second embodiment when the speaker is cut by a plane that is parallel to an X-Z plane and includes the central axis O.

In a speaker 101, illustrated in FIG. 3, in a second embodiment of the present invention, a sensor support member 126 is fitted and fixed to the front end (in the Z1 direction) of the center hole 15 formed in the inner yoke 14. The circuit board 24 and magnetic sensor 21 are fixed to the front of the sensor support member 126. The magnetic sensor 21 is positioned within the area of the center hole 15 and is positioned substantially on the central axis O when the structure of the detection unit is viewed in an X-Y plane perpendicular to the front-back direction, which is the vibration direction of the vibration unit, or by projecting the structure of the detection unit to an X-Y plane. However, the magnetic sensor 21 is not positioned in the center hole 15 but in a space in front of the center hole 15.

In the speaker 101 of this type as well, the magnetic sensor 21 is positioned within the area of the center hole 15 and is positioned substantially on the central axis O when the structure of the detection unit is viewed in an X-Y plane or by projecting the structure of the detection unit to an X-Y plane. Therefore, the fixed magnetic field component H1 can be stably detected by the magnetic sensor 21 as a strong magnetic field.

The sensor support member 26 illustrated in FIGS. 1A and 2 or the sensor support member 126 illustrated in FIG. 3 closes the center hole 15 in the inner yoke 14. Therefore, it is possible to prevent dust or moisture from entering a space between the cap 8 or 108 and the front end of the inner yoke 14.

Figure 4:
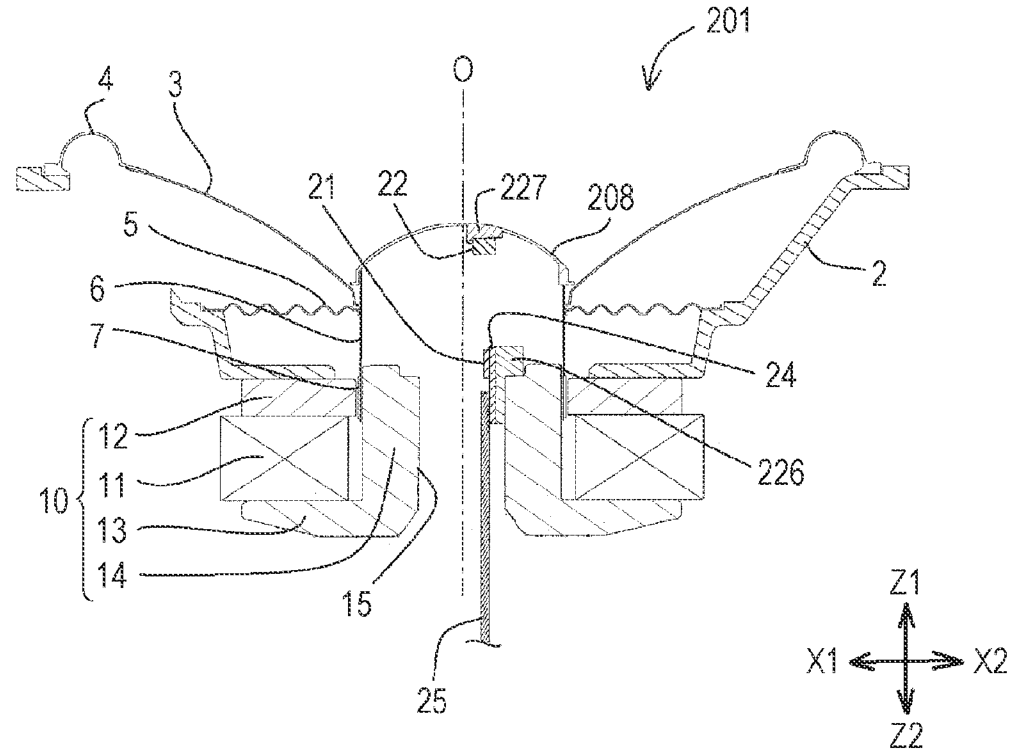
FIG. 4 is a sectional view illustrating a speaker in a third embodiment when the speaker is cut by a plane that is parallel to an X-Z plane and includes the central axis O.

In a speaker 201 in a third embodiment illustrated in FIG. 4, a sensor support member 226 is fixed to the edge of the center hole 15 in the inner yoke 14, and the magnetic sensor 21 supported by the sensor support member 226 is placed at a position radially deviating from the central axis O toward the outside. The front edge of the bobbin 6 is covered with a cap 208. The movable magnet 22 is supported by a magnet support member 227 formed integrally with the cap 208. The movable magnet 22 is also positioned so that it is radially distant from the central axis O toward the outside. However, the magnetic sensor 21 and movable magnet 22 are preferably positioned on the same axis parallel to the central axis O.

In the speaker 201 of this type as well, the magnetic sensor 21 is positioned within the area of the center hole 15 when the structure of the detection unit is viewed in an X-Y plane or by projecting the structure of the detection unit to an X-Y plane. Therefore, the fixed magnetic field component H1 can be stably detected by the magnetic sensor 21 as a strong magnetic field.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A speaker having a vibration unit that has a diaphragm, a bobbin fixed to the diaphragm, and a voice coil disposed on the bobbin, a support unit that supports the vibration unit so that the vibration unit vibrates, and a magnetic circuit unit included in the support unit, wherein:

the magnetic circuit unit has a magnetic gap in which the voice coil is positioned, an inner yoke positioned more inside than is the magnetic gap, and a fixed magnet that forms a driving magnetic flux that traverses the magnetic gap and flows in the inner yoke in a vibration direction in which the vibration unit vibrates;

a movable magnet is fixed to the vibration unit, the movable magnet forming a movable magnetic flux oriented so as to cross the vibration direction;

a magnetic sensor is fixed to the support unit, the magnetic sensor being positioned more inside than is the magnetic gap when viewed in a plane perpendicular to the vibration direction; and a fixed magnetic field component and a movable magnetic field component are detected by the magnetic sensor, the fixed magnetic field component acting in the vibration direction according to a leakage flux from the magnetic circuit unit, the movable magnetic field component acting in a direction crossing the fixed magnetic field component, according to the movable magnetic flux, and operation of the vibration unit is measured according to a change in strength of the movable magnetic field component.

2. The speaker according to claim 1, wherein an orientation of a combined vector formed from the fixed magnetic field component and the movable magnetic field component is detected by the magnetic sensor.

3. The speaker according to claim 1, wherein a ratio in strength between the fixed magnetic field component and the movable magnetic field component is detected by the magnetic sensor.

4. The speaker according to claim 1, wherein a center hole along the vibration direction is formed in the inner yoke, and the magnetic sensor is positioned in an area of the center hole when viewed in a plane perpendicular to the vibration direction.

5. The speaker according to claim 4, wherein a sensor support member is fixed to the inner yoke, the magnetic sensor is supported by the sensor support member, and a wiring material having continuity with the magnetic sensor passes through an interior of the center hole and extends to an outside.

6. The speaker according to claim 5, wherein a circuit board is fixed to the sensor support member, the magnetic sensor is mounted on the circuit board, and in a state in which the sensor support member, the circuit board, the magnetic sensor, and the wiring material are unitized by being assembled in advance, the sensor support member, the circuit board, the magnetic sensor, and the wiring material are inserted into the interior of the center hole.

7. The speaker according to claim 5, wherein the center hole is covered with the sensor support member.

8. The speaker according to claim 1, wherein a cap that covers the bobbin from the same side as the diaphragm is provided in the vibration unit, and the movable magnet is fixed to the cap.

9. The speaker according to claim 1, wherein the movable magnet and the magnetic sensor are positioned on a central axis that passes through a center of the bobbin and extends in the vibration direction or on a single axis parallel to the central axis.

10. A speaker having a vibration unit that has a diaphragm, a bobbin fixed to the diaphragm, and a voice coil disposed on the bobbin, a support unit that supports the vibration unit so that the vibration unit vibrates, and a magnetic circuit unit included in the support unit, wherein:

- the magnetic circuit unit has a magnetic gap in which the voice coil is positioned, an inner yoke positioned more inside than is the magnetic gap, and a fixed magnet that forms a driving magnetic flux that traverses the magnetic gap and flows in the inner yoke in a vibration direction in which the vibration unit vibrates;
- a movable magnet is fixed to the vibration unit, the movable magnet forming a movable magnetic flux oriented so as to cross the vibration direction;
- a center hole along the vibration direction is formed in the inner yoke;
- a magnetic sensor is fixed to the support unit, the magnetic sensor being positioned within an area of the center hole when viewed in a plane perpendicular to the vibration direction; and
- a fixed magnetic field component and a movable magnetic field component are detected by the magnetic sensor, the fixed magnetic field component acting in the vibration direction according to a leakage flux from the magnetic circuit unit, the movable magnetic field component acting in a direction crossing the fixed magnetic field component, according to the movable magnetic flux, and operation of the vibration unit is measured according to a change in strength of the movable magnetic field component;
- wherein the movable magnet and the magnetic sensor are positioned on a central axis that passes through a center of the bobbin and extends in the vibration direction or on a single axis parallel to the central axis.

11. The speaker according to claim 10, wherein an orientation of a combined vector formed from the fixed magnetic field component and the movable magnetic field component is detected by the magnetic sensor.

12. The speaker according to claim 10, wherein a ratio in strength between the fixed magnetic field component and the movable magnetic field component is detected by the magnetic sensor.

13. The speaker according to claim 10, wherein a sensor support member is fixed to the inner yoke, the magnetic sensor is supported by the sensor support member, and a wiring material having continuity with the magnetic sensor passes through an interior of the center hole and extends to an outside.

14. The speaker according to claim 13, wherein a circuit board is fixed to the sensor support member, the magnetic sensor is mounted on the circuit board, and in a state in which the sensor support member, the circuit board, the magnetic sensor, and the wiring material are unitized by being assembled in advance, the sensor support member, the circuit board, the magnetic sensor, and the wiring material are inserted into the interior of the center hole.

15. The speaker according to claim 13, wherein the center hole is covered with the sensor support member.

16. The speaker according to claim 10, wherein a cap that covers the bobbin from the same side as the diaphragm is provided in the vibration unit, and the movable magnet is fixed to the cap.

17. A speaker having a vibration unit that has a diaphragm, a bobbin fixed to the diaphragm, and a voice coil disposed on the bobbin, a support unit that supports the vibration unit so that the vibration unit vibrates, and a magnetic circuit unit included in the support unit, wherein:

- the magnetic circuit unit has a magnetic gap in which the voice coil is positioned, an inner yoke positioned more inside than is the magnetic gap, and a fixed magnet that forms a driving magnetic flux that traverses the magnetic gap and flows in the inner yoke in a vibration direction in which the vibration unit vibrates;
- a movable magnet is fixed to the vibration unit, the movable magnet forming a movable magnetic flux oriented so as to cross the vibration direction;
- a center hole along the vibration direction is formed in the inner yoke;
- a sensor support member is fixed to the inner yoke, and a magnetic sensor is supported by the sensor support member;
- a wiring material having continuity with the magnetic sensor passes through an interior of the center hole and extends to an outside; and
- a fixed magnetic field component and a movable magnetic field component are detected by the magnetic sensor, the fixed magnetic field component acting in the vibration direction according to a leakage flux from the magnetic circuit unit, the movable magnetic field component acting in a direction crossing the fixed magnetic field component, according to the movable magnetic flux, and operation of the vibration unit is measured according to a change in strength of the movable magnetic field component.

* * * * *